Dec. 6, 1932. A. SALVI 1,889,812
ANTIVIBRATING SELF BALANCED SUSPENSION CLAMP
Filed Feb. 27, 1931
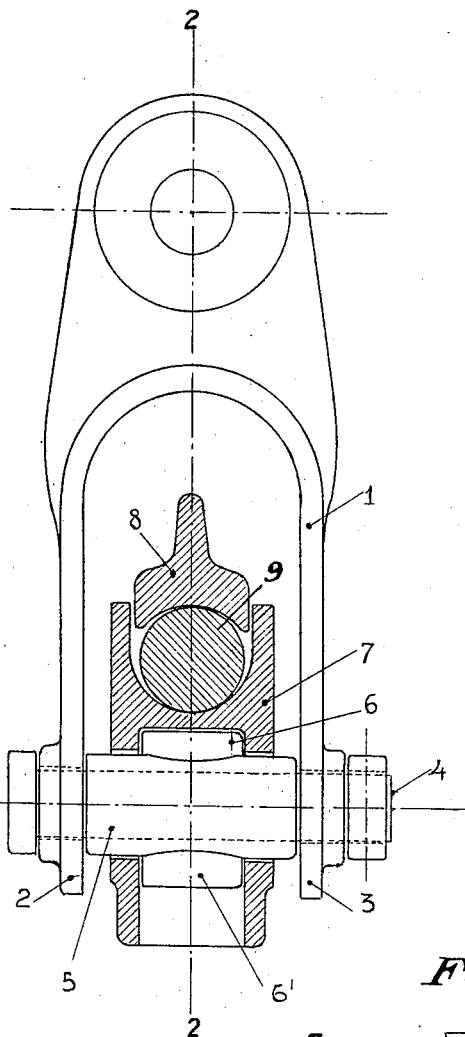
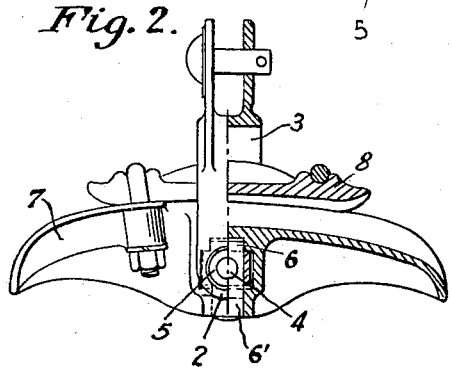
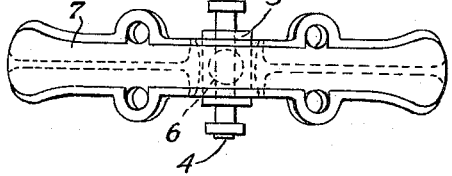
INVENTOR
Alessandro Salvi Patented Dec. 6, 1932

1,889,812

UNITED STATES PATENT OFFICE

ALESSANDRO SALVI, OF MILAN, ITALY

ANTIVIBRATING SELF-BALANCED SUSPENSION CLAMP

Application filed February 27, 1931, Serial No. 518,847, and in Italy July 21, 1930.

Anti-vibration suspension clamps for high tension electric transmission lines are known which are provided with a rotatable bearing disposed below the conductor, such devices being termed auto-balanced. Devices of this type are also known which are provided with a double suspension strap, with two axes of oscillation disposed at right angles to one another, of which one permits oscillations in a direction transverse with respect to the length of the line.

The present invention has for its object an improved anti-vibrating self-balanced suspension device which permits oscillations of the member to which the line is secured about a vertical axis arranged perpendicular to the axis of a horizontally disposed bearing for the device which is arranged below the conductor. This arrangement is characterised by a saddle member carrying the conductor being fitted in a suspension strap and mounted upon two vertically disposed trunnions secured to a sleeve which is rotatably mounted upon a horizontally disposed bearing pin mounted between the two limbs of the suspension strap.

This arrangement provides a double oscillatory suspension clamp which is located within the actual body of the supporting member for the cable, and consequently is not exposed to atmospheric influences. Thus the most favourable conditions are insured for an anti-vibration, auto-balanced suspension device provided with a transverse bearing arranged below the conductor.

In order that the invention may be fully understood, reference is directed to the accompanying drawing in which:

Fig. 1 is a transverse section of a form of the invention.

Fig. 2 is another view of the same, partly in side elevation and partly in section along the line 2—2 of Fig. 1.

Fig. 3 is a top plan view, the supporting strap and cap being omitted.

A bifurcated suspension or supporting strap 1 is provided, having legs or branches 2, 3. In the lower ends of these branches a horizontal bearing pin 4 is mounted. A sleeve 5 is rotatably mounted on the pin 4. This sleeve carries rigidly trunnions 6, 6' extending above and below the sleeve. A saddle member 7 is provided with a vertically disposed opening in which these trunnions fit. A transmission line 9 rests on the saddle 7 and is held in place by the clamp 8.

It is obvious that the saddle 7 may turn about a vertical axis on the trunnions 6, 6' and that it may turn with the trunnions about a horizontal axis on the pins 4. In this way the line is universally supported.

The details of construction may be varied without departing from the scope of the invention.

What I claim is:

An anti-vibrating self-balanced suspension clamp for electric transmission lines, comprising a suspension strap having two branches, a horizontal bearing pin mounted between said branches, a sleeve rotatably mounted on said pin, vertically disposed aligned trunnions on said sleeve, and a saddle member rotatably mounted on said trunnions.

In testimony whereof I affix my signature.

ALESSANDRO SALVI.